(12) United States Patent
Chang et al.

(10) Patent No.: US 12,517,816 B2
(45) Date of Patent: Jan. 6, 2026

(54) MODEL BASED ERROR AVOIDANCE

(71) Applicant: Micron Technology, Inc., Boise, ID (US)

(72) Inventors: Li-Te Chang, San Jose, CA (US); Charles S. Kwong, Redwood City, CA (US); Wei Wang, Dublin, CA (US); Murong Lang, San Jose, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 85 days.

(21) Appl. No.: 18/383,712

(22) Filed: Oct. 25, 2023

(65) Prior Publication Data

US 2025/0138996 A1 May 1, 2025

Related U.S. Application Data

(60) Provisional application No. 63/422,231, filed on Nov. 3, 2022.

(51) Int. Cl.
*G06F 12/02* (2006.01)
(52) U.S. Cl.
CPC .................... *G06F 12/023* (2013.01)
(58) Field of Classification Search
CPC ..................................................... G06F 12/023
See application file for complete search history.

(56) References Cited

U.S. PATENT DOCUMENTS

| | | | | |
|---|---|---|---|---|
| 2018/0173447 A1* | 6/2018 | Chin | ...................... | G06F 3/0619 |
| 2019/0004734 A1* | 1/2019 | Kirshenbaum | ........ | G06F 3/0679 |
| 2019/0006003 A1* | 1/2019 | Kirshenbaum | ...... | G11C 11/5628 |
| 2019/0198069 A1* | 6/2019 | Kale | ........ | G11C 29/36 |
| 2021/0311879 A1* | 10/2021 | Kang | ................. | G06F 12/0246 |
| 2022/0076738 A1* | 3/2022 | Bazarsky | ............ | G11C 11/5628 |
| 2022/0222138 A1* | 7/2022 | Park | ....................... | G11C 29/021 |
| 2022/0230697 A1* | 7/2022 | Di Vincenzo | .......... | G11C 29/52 |

* cited by examiner

*Primary Examiner* — Prasith Thammavong
(74) *Attorney, Agent, or Firm* — Schwegman Lundberg & Woessner, P.A.

(57) ABSTRACT

Aspects of the present disclosure configure a system component, such as a memory sub-system controller, to perform adaptive read level threshold voltage operations. The controller determines a first read level offset associated with reading a first set of data from a first level using a first read level of a plurality of read levels. The controller applies the first read level offset to a machine learning model to estimate a second read level offset, associated with reading a second set of data from a second level of the plurality of levels, using a second read level of the plurality of read levels. The controller updates, based on the first read level offset and the estimated second read level offset, a look-up table that includes a set of read level offsets used to read data from the plurality of levels of the individual component.

20 Claims, 7 Drawing Sheets

| Feature | 1 | 2 | 3 | 4 | 5 | 6 | 7 |
|---|---|---|---|---|---|---|---|
| Lv 1 | 0 | 0 | 2 | 0 | 0 | 4 | 5 |
| Lv 2 | -1 | -2 | -2 | -3 | -4 | -4 | -5 |
| Lv 3 | -2 | -4 | -4 | -6 | -8 | -8 | -9 |
| Lv 4 | -2 | -4 | -6 | -6 | -8 | -11 | -13 |
| Lv 5 | -3 | -6 | -7 | -9 | -12 | -14 | -17 |
| Lv 6 | -4 | -8 | -10 | -12 | -16 | -20 | -23 |
| Lv 7 | -6 | -12 | -15 | -18 | -24 | -30 | -36 |

MODEL BASED ERROR AVOIDANCE

PRIORITY APPLICATION

This application claims the benefit of priority to U.S. Provisional Application Ser. No. 63/422,231, filed Nov. 3, 2022, which is incorporated herein by reference in its entirety.

TECHNICAL FIELD

Embodiments of the disclosure relate generally to memory sub-systems and, more specifically, to performing adaptive memory read level threshold operations in a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure configure a system component, such as a memory sub-system controller, to performing adaptive read level operations for a memory sub-system. The memory sub-system controller can implement a machine learning model that estimates the read level offset to apply to one or more other levels of the memory based on a determined read level offset of an individual level. For example, the machine learning model can estimate the read level offsets for levels 1-6 based on a read level offset determined for level 7 based on a scanning operation. The estimated read level offsets can then be used to update values stored in a look-up table of read level offsets to improve execution of read requests received from a host. By adaptively and dynamically modifying predetermined read level offsets stored in a look-up table based on a trained machine learning model, the number of errors resulting from performing a read operation are reduced and the efficiency at which data is retrieved from one or more levels of the memory is increased which improves the overall efficiency of operating the memory sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can send access requests (e.g., write command, read command, sequential write command, sequential read command) to the memory sub-system, such as to store data at the memory sub-system and to read data from the memory sub-system. The data specified by the host is hereinafter referred to as "host data" or "user data".

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., ECC codeword, parity code), data version (e.g., used to distinguish age of data written), valid bitmap (which LBAs or logical transfer units contain valid data), etc.

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data".

"User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, NUTS data, etc.

A memory device can be a non-volatile memory device. A non-volatile memory device is a package of one or more dice. Each die can comprise one or more planes. For some types of non-volatile memory devices (e.g., NAND devices), each plane comprises a set of physical blocks. For some memory devices, blocks are the smallest area that can be erased. Each block comprises a set of pages. Each page comprises a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package. The memory device can be divided into one or more zones where each zone is associated with a different set of host data or user data or application.

Typical memory systems leverage superblocks which are a collection of blocks across memory planes and/or dies. Namely, each superblock can be of equal size and can include a respective collection of blocks across multiple planes and/or dies. The superblocks, when allocated, allow a controller to simultaneously write data to a large portion of memory spanning multiple blocks (across multiple planes and/or dies) with a single address.

Conventional memory sub-systems store data in memory components (e.g., blocks or superblocks) in various levels each associated with a different read level or read threshold voltage. For example, data can be stored and represented in the memory sub-system at different read levels. Specifically, in a TLC memory device, data can be stored in one of eight different read levels of the memory sub-system. Charges stored at the different read levels can be read and interpreted into a set of three bits. Ideally, the data is read by applying a read level within a center of valley (CoV) which defines a range of voltage levels that can be applied to accurately read the data from an individual one of the eight different read levels.

In certain situations, the charges stored at one of the read levels can be lost or shift around, such as due to slow charge loss (SLC), which results in poor data retention and inaccuracies when read at the predetermined read level or even within a previously computed CoV. In these circumstances, as part of correcting the read errors that are encountered, the read level or CoV used to read the data may need to be adjusted. One way to adjust the read level may involve preforming reads at adjacent read levels that are offset from the predetermined read level by predefined voltage thresholds. Namely, typical systems store a look-up table of different read level offsets to use to read data from respective read levels that has been stored in the memory for different periods of time. These different periods of time are defined by respective bins of the look-up table where each bin lists the corresponding set of read level offsets to use to read that data from the respective read level. While this approach generally works well, the range of read levels defined by the look-up table is generically applied across a wide range of memory systems and may not be accurate for a given set of environmental conditions to which a particular memory system is exposed. This one-size-fits-all approach leads to poor data retention and increased number of errors that result from read operations which results in poor data recovery and failure to recover data in performing error correction.

Aspects of the present disclosure address the above and other deficiencies by configuring a system component, such as a memory sub-system controller of a memory sub-system, to determine a correction (e.g., an offset) to an individual read level defined by the look-up table used to read data from a set of memory components using a machine learning model. Specifically, the machine learning model is trained at manufacture of the memory sub-system to estimate different read level offsets under different environmental conditions and data storage conditions (e.g., collectively referred to as features of the memory components). The machine learning model can then be applied in real time to update the values stored in the look-up table for a given memory sub-system to more accurately represent the conditions to which the memory sub-system is exposed. This results in read level offsets that are better suited and tailored to the memory sub-system and that are dynamically updated which improves data retention and reduces a number of errors that result from read operations which improves the overall efficiency of operating the device.

In some examples, a memory sub-system including a set of memory components is provided. The set of memory components include an individual component configured to store data in a plurality of levels each associated with a read level of a plurality of read levels. A processing device is provided that is operatively coupled to the set of memory components and configured to perform operations including determining a first read level offset associated with reading a first set of data from a first level of the plurality of levels of the individual component using a first read level of the plurality of read levels. The processing device applies the first read level offset to a machine learning model to estimate a second read level offset associated with reading a second set of data from a second level of the plurality of levels using a second read level of the plurality of read levels. The processing device updates, based on the first read level offset and the estimated second read level offset, a look-up table which represents a set of read level offsets used to read data from the plurality of levels of the individual component.

In some examples, the processing device identifies a bin of a plurality of bins of the look-up table corresponding to the first read level offset. The processing device replaces an individual read level offset value of the set of read level offsets associated with the identified bin and corresponding to the second read level with a value of the estimated read level offset. In some examples, the processing device estimates, by the machine learning model, read level offsets for each of the plurality of levels using the first read level offset. In some examples, the processing device identifies a bin of the plurality of bins corresponding to the first read level offset and replaces each read level offset value of the set of read level offsets associated with the identified bin and corresponding to a respective one of the plurality of levels with a respective value of the estimated read level offsets.

In some examples, the first read level offset is determined by performing a scan operation on the individual component to determine the first read level offset. In some examples, the processing device gradually applies different read levels to read the first set of data and determines that the first read level offset has been reached in response to determining that an individual one of the different read levels reaches a CoV. In some examples, the processing device determines a bin of the plurality of bins that is currently associated with the individual component. The processing device accesses the set of read level offsets of the determined bin stored in the look-up table and reads one or more data sets from an individual level of the plurality of levels of the individual component using a read level that is computed using an individual read level offset of the set of read level offsets corresponding to the individual level.

In some examples, the machine learning model is trained during manufacture of the memory sub-system. In some examples, the machine learning model includes at least one of an artificial neural network (ANN) or a linear regression model. In some examples, the machine learning model is trained based on training data to establish a relationship between a plurality of features including one or more first read level offsets and ground truth read level offsets of one or more other levels of the plurality of levels. In some examples, the plurality of features include at least one of an operating temperature, a current bin of the plurality of bins, an elapsed programming time of data, a word line group (WLG), cycling, and/or a program erase count (PEC) of the individual component.

In some examples, the first level corresponds to level 7 of the individual component and the second level corresponds to any one of levels 1-6. In other cases, the first level corresponds to level 1 of the individual component and the second level corresponds to any one of levels 2-7. In yet other cases, the first level corresponds to any one of levels 1-7 of the individual component and the second level corresponds to any one of the other levels 1-7.

In some examples, the machine learning model includes a plurality of machine learning models, each of the plurality of machine learning models being trained to estimate a read level offset for a respective one of the plurality of levels based on the first read level offset. In some examples, the look-up table is updated periodically.

In some examples, the look-up table includes a plurality of tables each representing a different feature of a plurality of features associated with the set of memory components, each table of the plurality of tables comprising different read level offsets of the plurality of read levels. The plurality of features can include at least one of: an operating temperature, a current bin of a plurality of bins, an elapsed programming time of data, a word line group (WLG), cycling, or a program erase count (PEC) of the individual component. In some examples, the individual component includes a superblock including a plurality of memory blocks across a plurality of memory dies. In some examples, the memory sub-system includes a three-dimensional NAND storage device.

Though various embodiments are described herein as being implemented with respect to a memory sub-system (e.g., a controller of the memory sub-system), some or all of the portions of an embodiment can be implemented with respect to a host system, such as a software application or an operating system of the host system.

Figure 1:
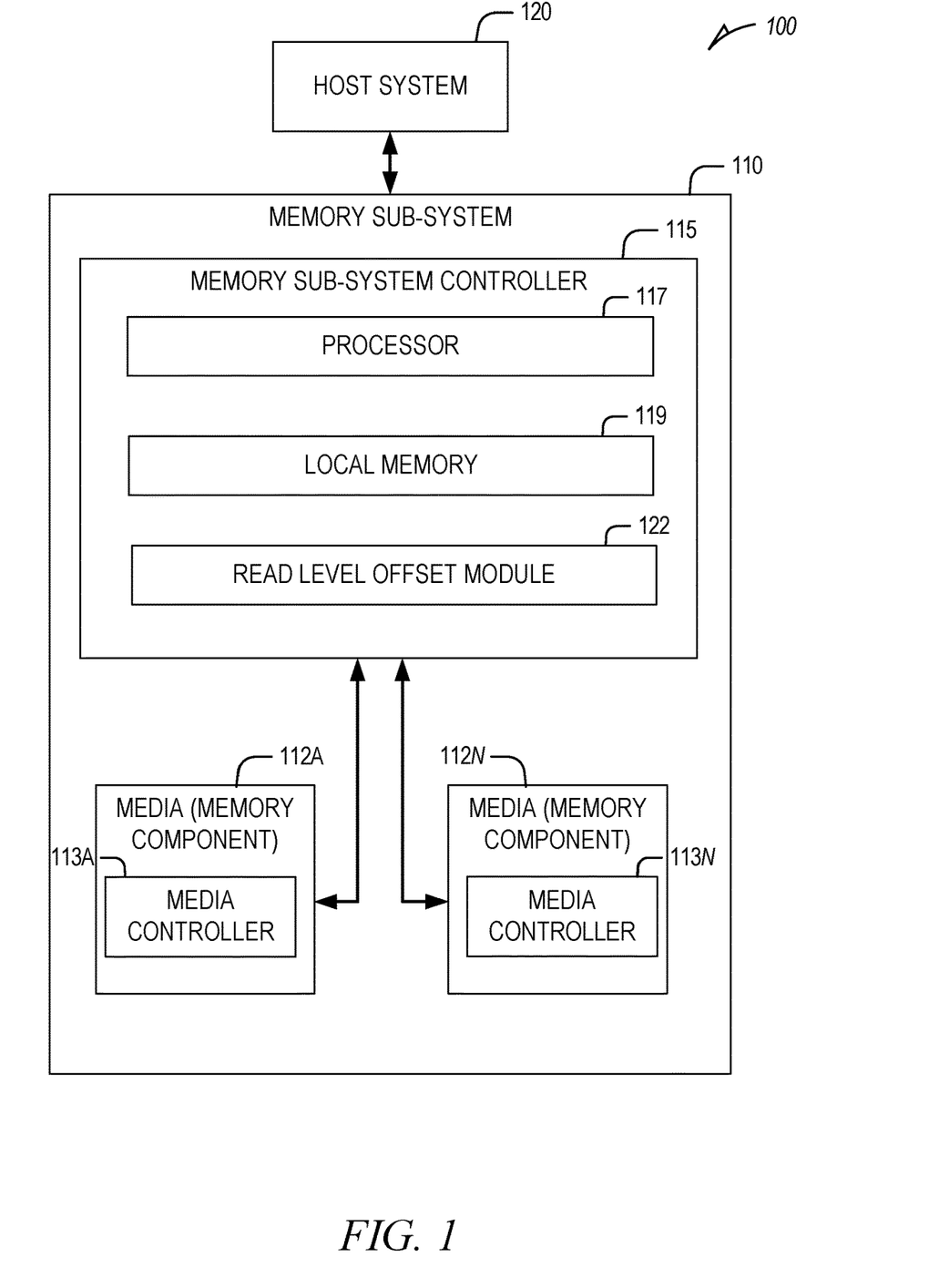
FIG. 1 is a block diagram illustrating an example computing environment including a memory sub-system, in accordance with some embodiments of the present disclosure.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. In some embodiments, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals (e.g., download and commit firmware commands/requests) between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory.

In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), three-dimensional (3D) NAND, and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages, blocks, or superblocks that can refer to a unit (or portion) of the memory component 112 used to store data.

The memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor 117 (processing device) configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive I/O commands or operations from the host system 120 and can convert the commands or operations into instructions or appropriate commands to achieve the desired access to the memory components 112A to 112N. The memory sub-system controller 115 can be responsible for other operations, based on instructions stored in firmware, such as wear leveling operations, garbage collection operations, error detection and ECC operations, decoding operations, encryption operations, caching operations, address translations between a logical block address and a physical block address that are associated with the memory components 112A to 112N, address translations between an application identifier received from the host system 120 and a corresponding zone of a set of zones of the memory components 112A to 112N. This can be used to restrict applications to reading and writing data only to/from a corresponding zone of the set of zones that is associated with the respective applications. In such cases, even though there may be free space elsewhere on the memory components 112A to 112N, a given application can only read/write data to/from the associated zone, such as by erasing data stored in the zone and writing new data to the zone. The memory sub-system controller 115 can further include host interface circuitry to communicate with the host system 120 via the physical host interface. The host interface circuitry can convert the I/O commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115.

In some embodiments, the memory sub-system controller 115 can include a read level offset module 122. The read level offset module 122 can include sense circuitry, such as sense amplifiers, configured to determine the values of data on (e.g., read), or to determine the values of data to be written to, memory cells of the set of memory components 112A to 112N. For example, in a selected string of memory cells, one or more of the sense amplifiers can read a logic level in the selected memory cell in response to a read current (charge distribution) flowing in the memory array through the selected string to the data lines. In some cases, the read current (charge distribution) is compared to a read trim value (also referred to as a read level threshold voltage) or level and based on whether the read current (charge distribution) exceeds or transgresses the read trim value, the corresponding logic level can be determined. In some cases, the read level threshold controls the read level used to read the charge stored in a given cell. Over time the charge distribution stored in the cell can leak and so the read level threshold can be combined with a positive or negative offset to adjust for such leakage and to accurately read the charge distribution.

While certain embodiments refer to a comparison to a read level threshold voltage, similar techniques can be applied to comparing the read current to a read level threshold current. Over time (e.g., due to different features or environmental conditions of the memory sub-system), the current and/or voltage (charge distribution) that is stored by the string of memory cells can degrade and leak. The features that affect the current and/or voltage that is stored can include at least one of: an operating temperature, a current bin of a plurality of bins, an elapsed programming time of data, a word line group (WLG), cycling, or a program erase count (PEC) of the individual component. This results in an increase in the bit error rate when the data is read using a specific trim value or read by applying a specific read level threshold voltage to a cell to obtain the stored charge distribution. To address these issues, the disclosed techniques adaptively modify the trim value or offset applied to the read level based on one or more current features of the memory sub-system (e.g., the duration of time the data (charge distribution) has been stored by the memory cells) and using a machine learning model that has been trained during manufacture of the memory sub-system 110. In some examples, the trim value is increased and in other cases the trim value is decreased. This improves the ability to accurately read charge distributions stored by the memory cells to convert the charge distributions to the logical value or logical level which reduces the bit error rate.

While the disclosed embodiments pertain to adjusting the read level offset in a table that stores different read level offsets for one type of environmental condition or feature of the memory sub-system (e.g., a current bin representing the amount of time data has been programmed in an individual component of a set of memory components), similar techniques can be applied to any other type of table that stores different read level offsets for other features of the memory sub-system. In an example, a host or controller identifies a current feature of the memory sub-system and selects a corresponding table of a plurality of tables associated with the identified feature. The read level offsets defined and stored by the selected table can then be used to read, retrieve or access data from the memory components.

In order to accurately modify the trim values at the optimal or most efficient time and manner, the read level offset module 122 can read or determine a read level offset for a first read level (e.g., level 7, level 1, or any level between 1-7) and using that determined read level, the read level offset module 122 applies a machine learning model to estimate the read level offset for one or more of the other levels (e.g., levels 1-6 if the first read level is level 7). The machine learning model can estimate the read level offsets for all of the remaining levels or a particular one of the levels. Once the read level offsets for each of the levels of the particular memory component 112 are estimated and/or determined at least in part using the machine learning model, a look-up table that stores read level offsets for each level of the particular memory component 112 is updated. A subsequently received request from a host to read the particular memory component 112 can be received and processed, performed or executed in accordance with the updated read level offsets stored in the look-up table. This process improves the overall efficiency of operating the memory sub-system 110 by reducing the number of errors encountered when reading or retrieving a charge distribution using read level offsets stored in the look-up table.

In some cases, multiple look-up tables can be stored and associated with different features of the particular memory component. Each of the multiple look-up tables can represent different read level thresholds to apply and use for accessing data stored in different levels of the same memory component 112 under different conditions (e.g., features of the memory component 112). In such cases, the read level offsets in each of the multiple look-up tables can be updated based on the output of the machine learning model. For example, a first look-up table associated with PEC counts can store different read level offsets for different WLGs or read levels. In such cases, the read level offset for the first read level stored in the first look-up table can be determined and applied to the machine learning model to estimate and update the read level offsets of each additional read level stored in the first look-up table. A second look-up table associated with different bins representing how long data has been programmed in a memory component can store different read level offsets for different read levels. In such cases, the read level offset for the first read level stored in the second look-up table can be determined and applied to the machine learning model to estimate and update the read level offsets of each additional read level stored in the second look-up table.

For example, the read level offset module 122 determines a first read level offset associated with reading a first set of data from a first level of the plurality of levels of the individual component using a first read level of the plurality of read levels. The read level offset module 122 applies the first read level offset to a machine learning model to estimate a second read level offset associated with reading a second set of data from a second level of the plurality of levels using a second read level of the plurality of read levels. The read level offset module 122 updates, based on the first read level offset and the estimated second read level offset, a look-up table (e.g., a table that includes a plurality of bins each of which represents a set of read level offsets used to read data from the plurality of levels of the individual component). The set of read level offsets can each include a range of read level offsets for the respective level.

In some examples, the read level offset module 122 identifies a bin of the plurality of bins corresponding to the first read level offset and replaces an individual read level offset value of the set of read level offsets associated with the identified bin and corresponding to the second read level with a value of the estimated read level offset. In some aspects, the read level offset module 122 estimates, by the machine learning model, read level offsets for each of the plurality of levels using the first read level offset. In some examples, the read level offset module 122 identifies a bin of the plurality of bins corresponding to the first read level offset; and replacing each read level offset value of the set of read level offsets associated with the identified bin and corresponding to a respective one of the plurality of levels with a respective value of the estimated read level offsets.

In some examples, the first read level offset is determined by: performing a scan operation on the individual component to determine the first read level offset. In some examples, the read level offset module 122 gradually applies different read levels to read the first set of data and determines that the first read level offset has been reached in response to determining that an individual one of the different read levels reaches a CoV. In some cases, the read level offset module 122 determines a bin of the plurality of bins that is currently associated with the individual component. The read level offset module 122 accesses the set of read level offsets of the determined bin stored in the look-up table and reads one or more data sets from an individual level of the plurality of levels of the individual component using a read level that is computed using an individual read level offset of the set of read level offsets corresponding to the individual level.

In some examples, the machine learning model is trained during manufacture of the memory sub-system. In some examples, the machine learning model includes at least one of an artificial neural network or a linear regression model. In some aspects, the machine learning model is trained based on training data to establish a relationship between a plurality of features including one or more first read level offsets and ground truth read level offsets of one or more other levels of the plurality of levels. In some examples, the plurality of features includes at least one of an operating temperature, a current bin of the plurality of bins, an elapsed programming time of data, a WLG, cycling, and/or a PEC of the individual component.

In some examples, the first level corresponds to level 7 of the individual component and the second level corresponds to any one of levels 1-6. In some examples, the machine learning model includes a plurality of machine learning models, each of the plurality of machine learning models being trained to estimate a read level offset for a respective one of the plurality of levels based on the first read level offset. In some aspects, the look-up table is updated periodically. In some examples, each bin of the plurality of bins represents a different interval of time that data has been programmed in the individual component.

In some examples, the individual component includes a superblock including a plurality of memory blocks across a plurality of memory dies. In some aspects, the memory sub-system 110 includes a three-dimensional NAND storage device.

Depending on the embodiment, the read level offset module 122 can comprise logic (e.g., a set of transitory or non-transitory machine instructions, such as firmware) or one or more components that causes the memory sub-system 110 (e.g., the memory sub-system controller 115) to perform operations described herein with respect to the read level offset module 122. The read level offset module 122 can comprise a tangible or non-tangible unit capable of performing operations described herein. In some cases, the read level offset module 122 is included at least in part or in whole in the particular memory component 112.

Figure 2:
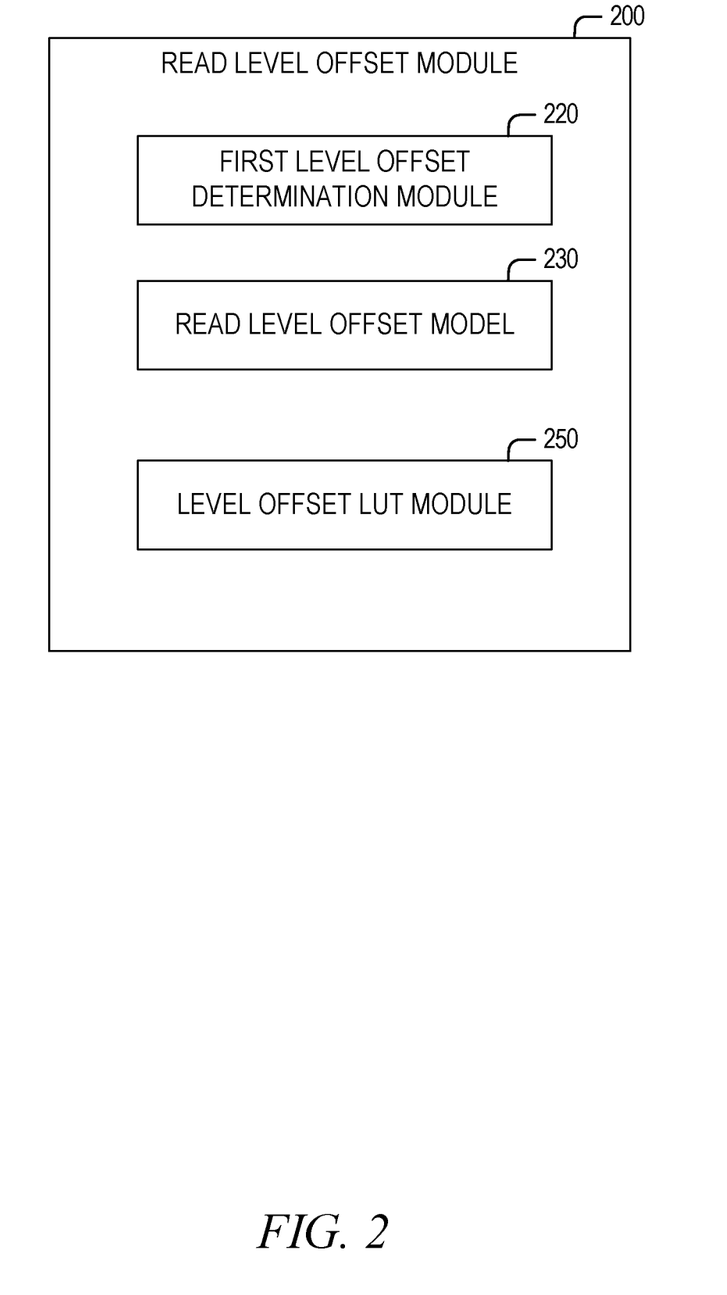
FIG. 2 is a block diagram of an example read level offset module, in accordance with some implementations of the present disclosure.

FIG. 2 is a block diagram of an example read level offset module 200, in accordance with some implementations of the present disclosure. The read level offset module 200 can represent the read level offset module 122 of FIG. 1. As illustrated, the read level offset module 200 includes a first level offset determination module 220, a read level offset model 230, and a level offset LUT module 250.

The read level offset module 200 can periodically perform a scan of the memory sub-system 110 or particular memory component 112 using the first level offset determination module 220. The scan can be used to determine a read level offset for a particular level of the particular memory component 112, such as level 7. To scan the particular memory component 112, the first level offset determination module 220 performs a plurality of reads at different read levels of the particular level. The charges obtained as a result of each read are used to determine whether the read was successful, such as based on a quantity of errors resulting from decoding data from the read performed at a particular read level offset. The read level offset that results in a read operation at the particular level with the fewest amount of error can be selected and used as a determined read level offset for the particular level. In some cases, this determined read level offset can be used to select or identify a given bin of a plurality of bins of read level offsets.

Figure 3:
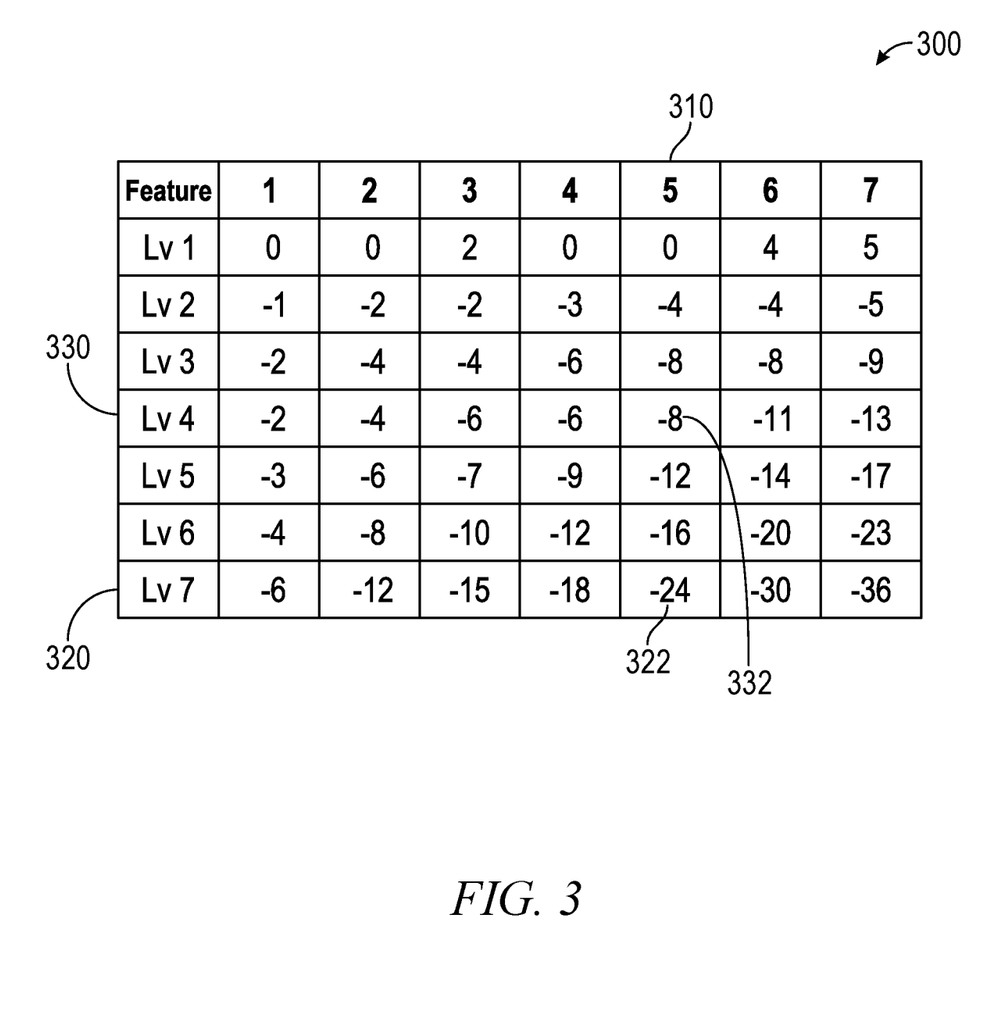
FIG. 3 is a block diagram of an example bin transition and read level offset table, in accordance with some implementations of the present disclosure.

FIG. 3 is a block diagram of an example bin transition and read level offset table 300, in accordance with some implementations of the present disclosure. The table 300 includes a plurality of bins 310 (e.g., BIN 1, BIN 2, BIN 3, BIN 4, and so forth). Each bin can be associated with a respective time interval that data has been stored to the particular memory component 112. Each bin can also be associated with a respective set of read level offsets for each of a plurality of levels of the particular memory component 112. The level offset table 300 can be implemented as part of the LUT module 250.

For example, a first bin (e.g., BIN 5) of the bins 310 can include various read level offsets 332 and 322 for respective levels 330 and 320 of the particular memory component 112. The LUT module 250 can receive the read level offset determined for the particular level by the first level offset determination module 220. The LUT module 250 searches all of the read level offsets (e.g., −6, −12, −15, −18, −24, −30, and −36) stored across the various bins 310 for the particular level (e.g., level 7) to find a range of read level offsets that corresponds to the read level offset determined for the particular level. If the first level offset determination module 220 determines that the particular level (e.g., level 7) corresponds to the read level offset value that falls within the read level offset range defined by the read level offset 322, the LUT module 250 selects or determines that the bin corresponding to the read level offset 322 is a current bin for the particular memory component 112 (e.g., the page, block or portion of the particular memory component 112).

The LUT module 250 communicates the read level offset 322 to the read level offset model 230 to estimate the read level offsets for other levels that are in the same first bin (e.g., BIN 5) as the bin determined to be current for the particular level (e.g., level 7). The read level offset model 230 implements a machine learning model which has been trained to estimate the read level offsets for one or more other levels of the particular memory component 112 given a read level offset of the first level (e.g., level 7). The LUT module 250 receives the one or more read level offsets that have been estimated by the read level offset model 230 and updates the value stored in the level offset table 300 for the corresponding levels. For example, the LUT module 250 updates the current value (e.g., −8) of the read level offset 332 stored in the first bin (e.g., BIN 5) for a second level (e.g., level 4) with a new value estimated by the read level offset model 230. The LUT module 250 performs this update for each of the read level offsets stored in the level offset table 300 for the first bin which are estimated by the read level offset model 230.

The read level offset module 200 can receive a request form a host to read data from the particular memory component 112. In response, the read level offset module 200 uses the current values stored in the LUT module 250 for a bin corresponding to a time period representing a duration of time data has been stored in the particular memory component 112. The LUT module 250 then reads the requested data from the particular memory component 112 using the read level offsets of the currently assigned bin (the bin corresponding to the duration of time data has been stored or the bin that includes a read level offset range that corresponds to a determined read level offset for a particular level). In response, the read level offset model 230 accesses the bin associated with the particular memory component 112 to retrieve a read level offset and then reads the particular memory component 112 based on a read level offset defined by the bin for a particular level or levels. Similar techniques can be applied to one or more additional tables that each stores different read level offsets for different read levels associated with other features (e.g., temperature and/or PEC count) of the memory sub-system.

Figure 4:
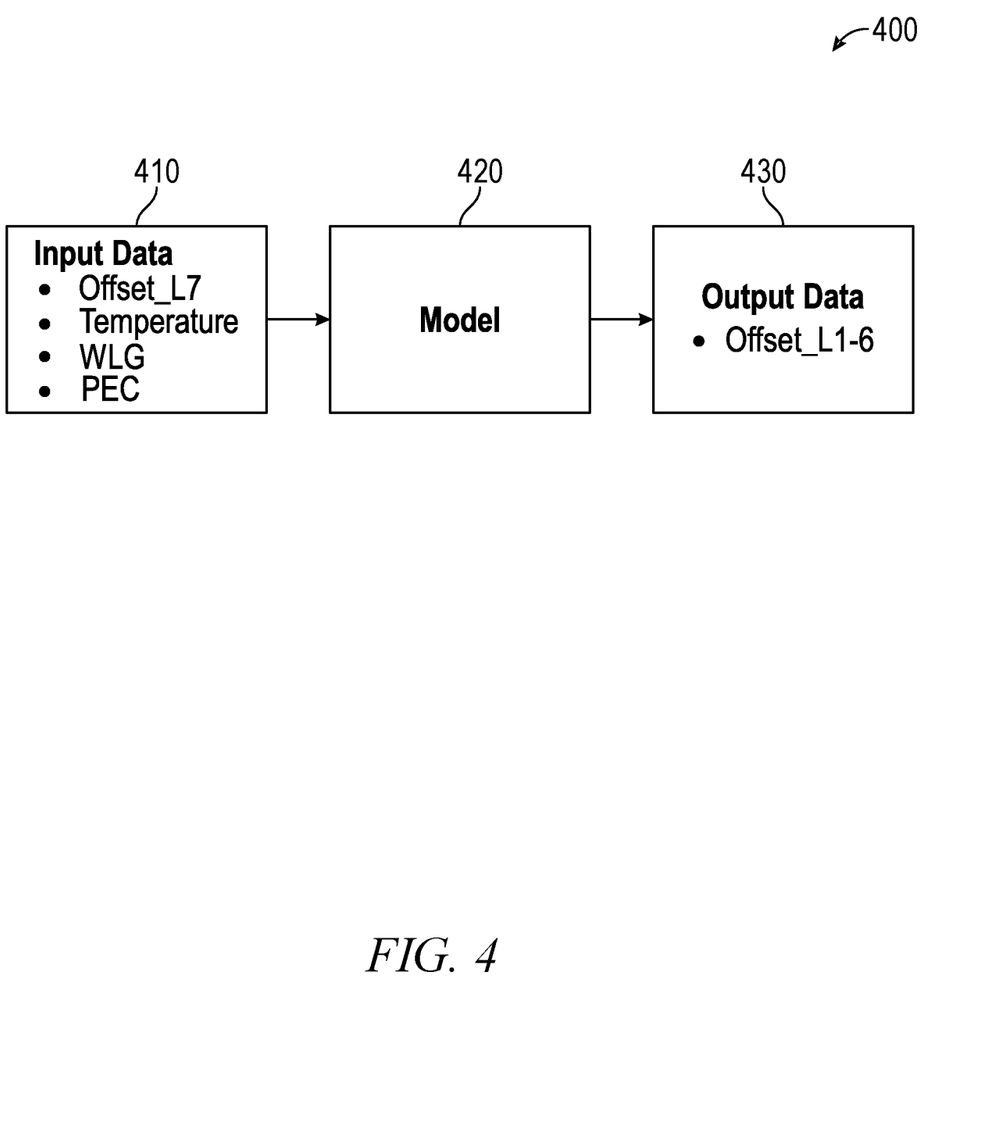
FIG. 4 is an illustrative read level offset model training diagram, in accordance with some implementations of the present disclosure.

FIG. 4 is an illustrative read level offset model training diagram 400, in accordance with some implementations of the present disclosure. The training in accordance with the diagram 400 can be performed during device manufacture or at runtime of the memory sub-system 110. The machine learning model 420 can receive a set of training data 410. The training data can include various features, such as a plurality of first read level offsets of a first level and associated with different temperatures, WLG, PEC, bins, and so forth along with corresponding ground truth (known) read level offsets for one or more other levels given the same factors (e.g., temperatures, WLG, PEC, bins, and so forth). The machine learning model 420 is trained based on regression to establish a relationship and compute coefficients that result in the estimation of the read level offsets for the one or more other levels (e.g., read level offset for level 5) based on the first read level offsets of the first level (e.g., level 7).

For example, the machine learning model 420 can select a first subset of the training data corresponding to a first instance of the first read level offset for the first level (e.g., level 7) based on the various other factors (e.g., temperature, WLG, PEC, bin, and so forth). The machine learning model 420 uses the first read level offset and the various other factors to estimate a read level offset for a second level (e.g., level 5) and provide the estimated read level offset for the second level among the output data 430. In some examples, the machine learning model 420 uses a log-linear model to estimate the second level. For example, the log-linear model can include a first equation representing the read level for the first read level offset: $L7(t)=C_{7,0}+C_{7,1}*\log(t)$; and a second equation representing the read level for the second read level offset: $L6(t)=C_{6,0}+C_{6,1}*\log(t)$. The log-linear model can compute the value of $\log(t)$ as a function of the first read level offset to estimate the value of the second read level offset. Specifically, the log-linear model can compute $\log(t')=(L7(t')-C_{7,0})/C_{7,1}$ and can estimate the second read level offset as a function of the first read level by computing $L6(t)=C_{6,0}+C_{6,1}*(L7(t')-C_{7,0})/C_{7,1}$. Similar equations can be used to estimate other read level offsets in a similar manner.

The machine learning model 420 obtains the ground truth read level offset for the second level from the first subset of the training data based on the same set of factors. The machine learning model 420 computes a deviation between the estimated read level offset for the second level and the ground truth read level offset for the second level. The machine learning model 420 then updates one or more parameters of the machine learning model 420 based on the deviation and repeats this process for multiple other levels (e.g., levels 1, 2, 3, 4, and 6) and for multiple other subsets of training data until one or more stopping criteria are reached. At that point, the machine learning model 420 is provided and included as the read level offset model 230 of the memory sub-system 110. The trained machine learning model 420 is used during runtime to estimate read level offsets for other levels given a determined read level offset for a given level.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data in order to make data-driven predictions or decisions expressed as outputs or assessments. Although examples are presented with respect to a few machine-learning tools, the principles presented herein may be applied to other machine-learning tools.

In some examples, different machine-learning tools may be used. For example, Logistic Regression (LR), Naive-Bayes, Random Forest (RF), artificial neural networks (ANN), deep NN (DNN), matrix factorization, and Support Vector Machines (SVM) tools may be used for classifying or scoring videos.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine-learning algorithms use features for analyzing the data to generate an assessment. Each of the features is an individual measurable property of a phenomenon being observed. The concept of a feature is related to that of an explanatory variable used in statistical techniques such as linear regression. Choosing informative, discriminating, and independent features is important for the effective operation of the MLP in pattern recognition, classification, and regression. Features may be of different types, such as numeric features, strings, and graphs.

In one example, the features may be of different types and may include one or more of content, concepts, attributes, historical data, and/or user data, merely for example. The machine-learning algorithms use the training data to find correlations among the identified features that affect the outcome or assessment. In some examples, the training data includes labeled data, which is known data for one or more identified features and one or more outcomes, such as estimating read level offsets for one or more levels given a known or determined read level offset for another level, etc.

With the training data and the identified features, the machine-learning tool is trained by a machine-learning program training. The machine-learning tool appraises the value of the features as they correlate to the training data. The result of the training is the trained machine-learning program. When the trained machine-learning program is used to perform an assessment, new data is provided as an input to the trained machine-learning program, and the trained machine-learning program generates the assessment as output.

The machine-learning program supports two types of phases, namely a training phase and prediction phase. In training phases, supervised learning, unsupervised or reinforcement learning may be used. For example, the machine-learning program (1) receives features (e.g., as structured or labeled data in supervised learning) and/or (2) identifies features (e.g., unstructured or unlabeled data for unsupervised learning) in training data. In prediction phases, the machine-learning program uses the features for analyzing determined read level offsets of a given level and current environmental factors (e.g., temperature, PEC, and so forth) to generate outcomes or predictions for read level offsets for other levels, as examples of an assessment.

In the training phase, feature engineering is used to identify features and may include identifying informative, discriminating, and independent features for the effective operation of the machine-learning program in pattern recognition, classification, and regression. In some examples, the training data includes labeled data, which is known data for pre-identified features and one or more outcomes. Each of the features may be a variable or attribute, such as individual measurable property of a process, article, system, or phenomenon represented by a data set (e.g., the training data).

In training phases, the machine-learning program uses the training data to find correlations among the features that affect a predicted outcome or assessment. With the training data and the identified features, the machine-learning program is trained during the training phase at machine-learning program training. The machine-learning program appraises values of the features as they correlate to the training data. The result of the training is the trained machine-learning program (e.g., a trained or learned model).

Further, the training phases may involve machine learning, in which the training data is structured (e.g., labeled during preprocessing operations), and the trained machine-learning program implements a relatively simple neural network capable of performing, for example, classification and clustering operations. In other examples, the training phase may involve deep learning, in which the training data is unstructured, and the trained machine-learning program implements a DNN that is able to perform both feature extraction and classification/clustering operations.

A neural network generated during the training phase, and implemented within the trained machine-learning program, may include a hierarchical (e.g., layered) organization of neurons. For example, neurons (or nodes) may be arranged hierarchically into a number of layers, including an input layer, an output layer, and multiple hidden layers. Each of the layers within the neural network can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron. In some cases, these neurons implement one or more encoder or decoder networks.

In some examples, the neural network may also be one of a number of different types of neural networks, including a single-layer feed-forward network, an Artificial Neural Network (ANN), GAN, a Recurrent Neural Network (RNN), a symmetrically connected neural network, and unsupervised pre-trained network, a Convolutional Neural Network (CNN), or a Recursive Neural Network (RNN), merely for example.

During prediction phases, the trained machine-learning program is used to perform an assessment. Determined read level offset for a given level of a set of levels (and optionally environmental factors) are provided as an input to the trained machine-learning program, and the trained machine-learning program generates the assessment as output (e.g., read level offsets for a remaining levels in the set of levels), responsive to receipt of the input data.

Figure 5A:
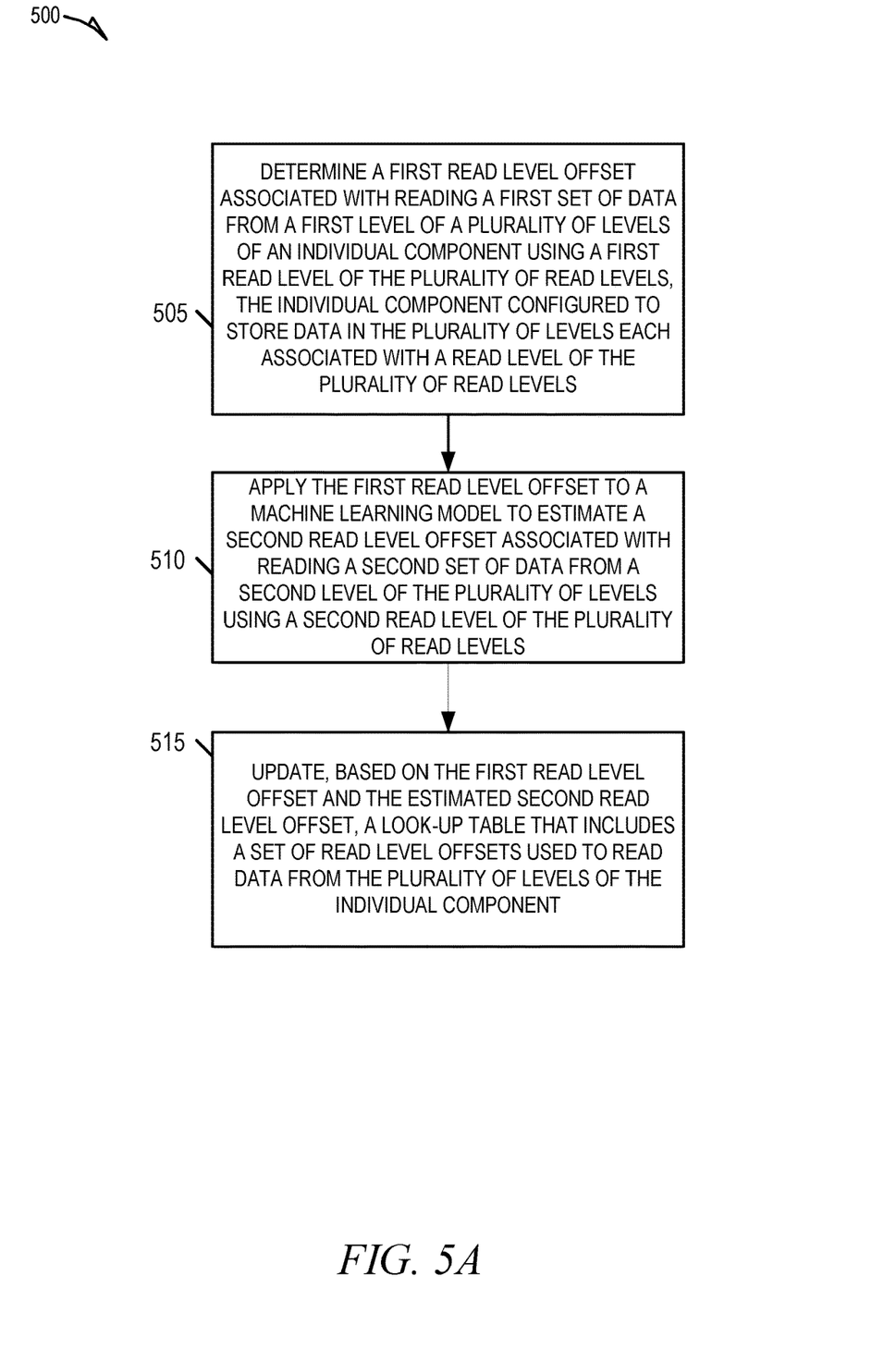
FIGS. 5A and 5B are flow diagrams of example methods to perform adaptive read level operations, in accordance with some implementations of the present disclosure.

FIG. 5A is a flow diagram of an example method 500 to perform adaptive read level operations, in accordance with some implementations of the present disclosure. Method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 500 is performed by the memory sub-system controller 115 or subcomponents of the controller 115 of FIG. 1. In these embodiments, the method 500 can be performed, at least in part, by the read level offset module 200. Although the processes are shown in a particular sequence or order, unless otherwise specified, the order of the processes can be modified. Thus, the illustrated embodiments should be understood only as examples; the illustrated processes can be performed in a different order, and some processes can be performed in parallel. Additionally, one or more processes can be omitted in various embodiments. Thus, not all processes are required in every embodiment. Other process flows are possible.

Referring now to FIG. 5A, the method (or process) 500 begins at operation 505, with the read level offset module 200 of a memory sub-system (e.g., of processor of the memory sub-system controller 115) determining a first read level offset associated with reading a first set of data from a first level of a plurality of levels of an individual component using a first read level of the plurality of read levels, the individual component configured to store data in the plurality of levels each associated with a read level of the plurality of read levels. Then, at operation 510, the read level offset module 200 applies the first read level offset to a machine learning model to estimate a second read level offset associated with reading a second set of data from a second level of the plurality of levels using a second read level of the plurality of read levels. The read level offset module 200, at operation 515, updates, based on the first read level offset and the estimated second read level offset, a look-up table which represents a set of read level offsets used to read data from the plurality of levels of the individual component.

Figure 5B:
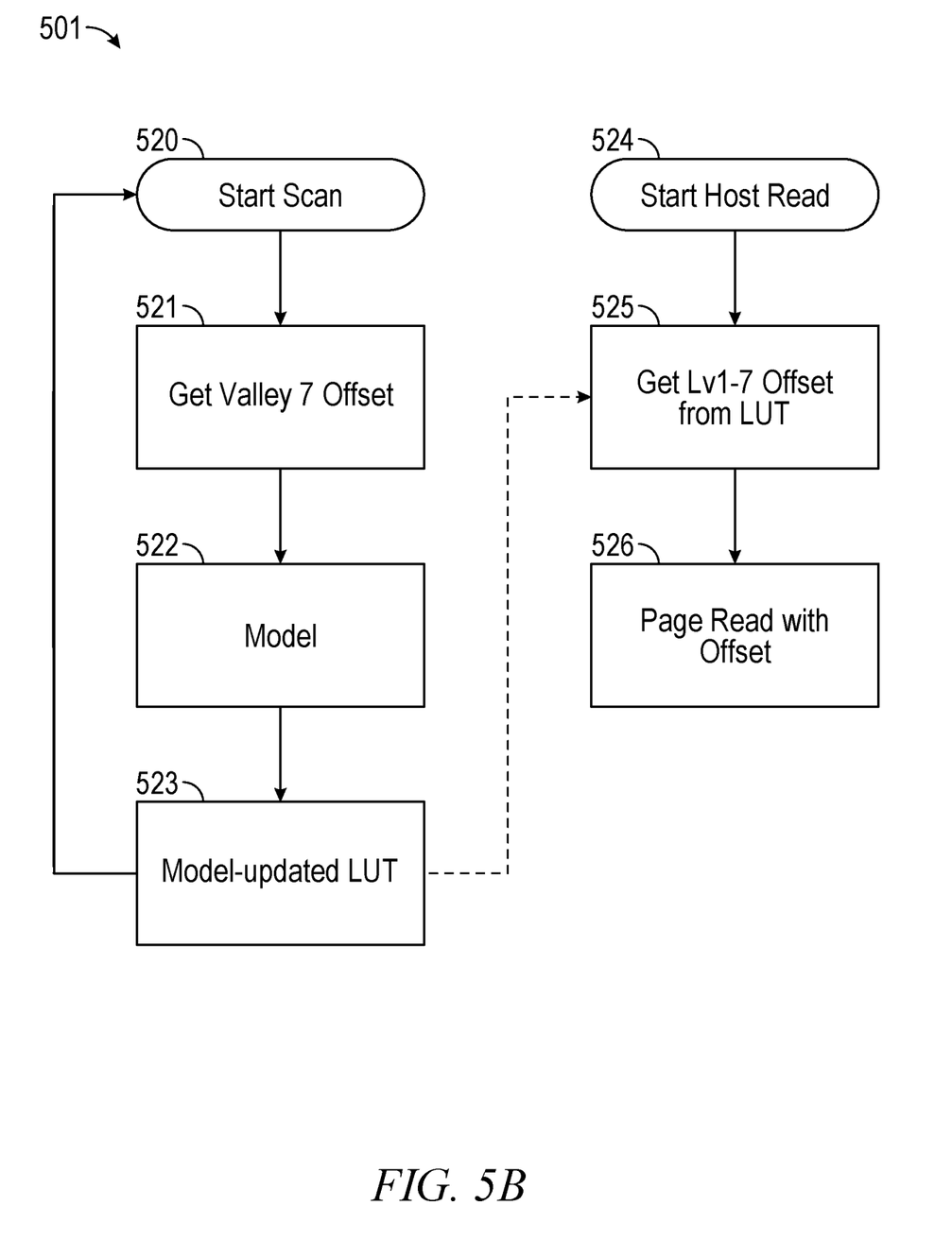

FIG. 5B is a flow diagram of an example method 501 to perform adaptive read level threshold voltage operations, in accordance with some implementations of the present disclosure. Method 501 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 501 is performed by the memory sub-system controller 115 or subcomponents of the controller 115 of FIG. 1. In these embodiments, the method 501 can be performed, at least in part, by the read level offset module 200. Although the processes are shown in a particular sequence or order, unless otherwise specified, the order of the processes can be modified. Thus, the illustrated embodiments should be understood only as examples; the illustrated processes can be performed in a different order, and some processes can be performed in parallel. Additionally, one or more processes can be omitted in various embodiments. Thus, not all processes are required in every embodiment. Other process flows are possible.

Referring now to FIG. 5B, the method (or process) 501 begins at operation 520 where a scan operation is performed to compute or determine a read level offset for a first read level at operation 521, such as the read level offset for level 7. Then, at operation 522, a machine learning model is accessed and used to estimate one or more other read level offsets using the determined read level offset for the first read level obtained at operation 521. A look-up table that lists various read level offsets for different read levels (e.g., associated with one or more features of the memory sub-system or components) is updated based on the estimated read level offsets and the determined read level offset at operation 523. The read level offset module 200 then receives a host read operation at operation 524 and, in response, the read level offset module 200, at operation 525, accesses the dynamically updated look-up table to retrieve the current read level offsets for the memory page, block, or portion being read by the host. The memory page, block or portion is read at operation 526 by the read level offset module 200 using the read level offset obtained from the look-up table that was dynamically updated by the machine learning model.

In view of the disclosure above, various examples are set forth below. It should be noted that one or more features of an example, taken in isolation or combination, should be considered within the disclosure of this application.

Example 1. A system comprising: a memory sub-system comprising a set of memory components; and a processing device, operatively coupled to the set of memory components and configured to perform operations comprising: determining a first read level offset, associated with reading a first set of data from a first level of a plurality of levels of an individual component of the set of memory components, using a first read level of a plurality of read levels; applying the first read level offset to a machine learning model to estimate a second read level offset, associated with reading a second set of data from a second level of the plurality of levels, using a second read level of the plurality of read levels; and updating, based on the first read level offset and the estimated second read level offset, a look-up table that includes a set of read level offsets used to read data from the plurality of levels of the individual component.

Example 2. The system of Example 1, the operations comprising: identifying a bin corresponding to the first read level offset; and replacing an individual read level offset value of the set of read level offsets associated with the identified bin and corresponding to the second read level with a value of the estimated read level offset.

Example 3. The system of any one of Examples 1-2, the operations comprising: estimating, by the machine learning model, read level offsets for each of the plurality of levels using the first read level offset.

Example 4. The system of any one of Examples 1-3, the operations comprising: identifying a bin corresponding to the first read level offset; and replacing each read level offset value of the set of read level offsets associated with the identified bin and corresponding to a respective one of the plurality of levels with a respective value of the estimated read level offsets.

Example 5. The system of any one of Examples 1-4, wherein the first read level offset is determined by: performing a scan operation on the individual component to determine the first read level offset.

Example 6. The system of Example 5, the operations comprising: gradually applying different read levels to read the first set of data; and determining that the first read level offset has been reached in response to determining that an individual one of the different read levels reaches a center of valley (CoV).

Example 7. The system of any one of Examples 1-6, the operations comprising: determining a bin of the plurality of bins that is currently associated with the individual component; accessing the set of read level offsets of the determined bin stored in the look-up table; and reading one or more data sets from an individual level of the plurality of levels of the individual component using a read level that is computed using an individual read level offset of the set of read level offsets corresponding to the individual level.

Example 8. The system of any one of Examples 1-7, wherein the machine learning model is trained during manufacture of the memory sub-system.

Example 9. The system of any one of Examples 1-8, wherein the machine learning model comprises at least one of an artificial neural network or a linear regression model.

Example 10. The system of any one of Examples 1-9, wherein the machine learning model is trained based on training data to establish a relationship between a plurality of features comprising one or more first read level offsets and ground truth read level offsets of one or more other levels of the plurality of levels.

Example 11. The system of Example 10, wherein the plurality of features includes at least one of an operating temperature, a current bin of the plurality of bins, an elapsed programming time of data, a word line group (WLG), cycling, or a program erase count (PEC) of the individual component.

Example 12. The system of any one of Examples 1-11, wherein the first level corresponds to level 7 of the individual component, and wherein the second level corresponds to any one of levels 1-6.

Example 13. The system of any one of Examples 1-12, wherein the machine learning model comprises a plurality of machine learning models, each of the plurality of machine learning models being trained to estimate a read level offset for a respective one of the plurality of levels based on the first read level offset.

Example 14. The system of any one of Examples 1-13, wherein the look-up table is updated periodically.

Example 15. The system of any one of Examples 1-14, wherein the look-up table comprises a plurality of tables each representing a different feature of a plurality of features associated with the set of memory components, each table of the plurality of tables comprising different read level offsets of the plurality of read levels.

Example 16. The system of any one of Example 15, wherein the plurality of features include at least one of: an operating temperature, a current bin of a plurality of bins, an elapsed programming time of data, a word line group (WLG), cycling, or a program erase count (PEC) of the individual component.

Example 17. The system of any one of Examples 1-16, wherein the memory sub-system comprises a three-dimensional NAND storage device, and wherein the individual component includes a superblock comprising a plurality of memory blocks across a plurality of memory dies.

Methods and computer-readable storage medium with instructions for performing any one of the above Examples.

Figure 6:
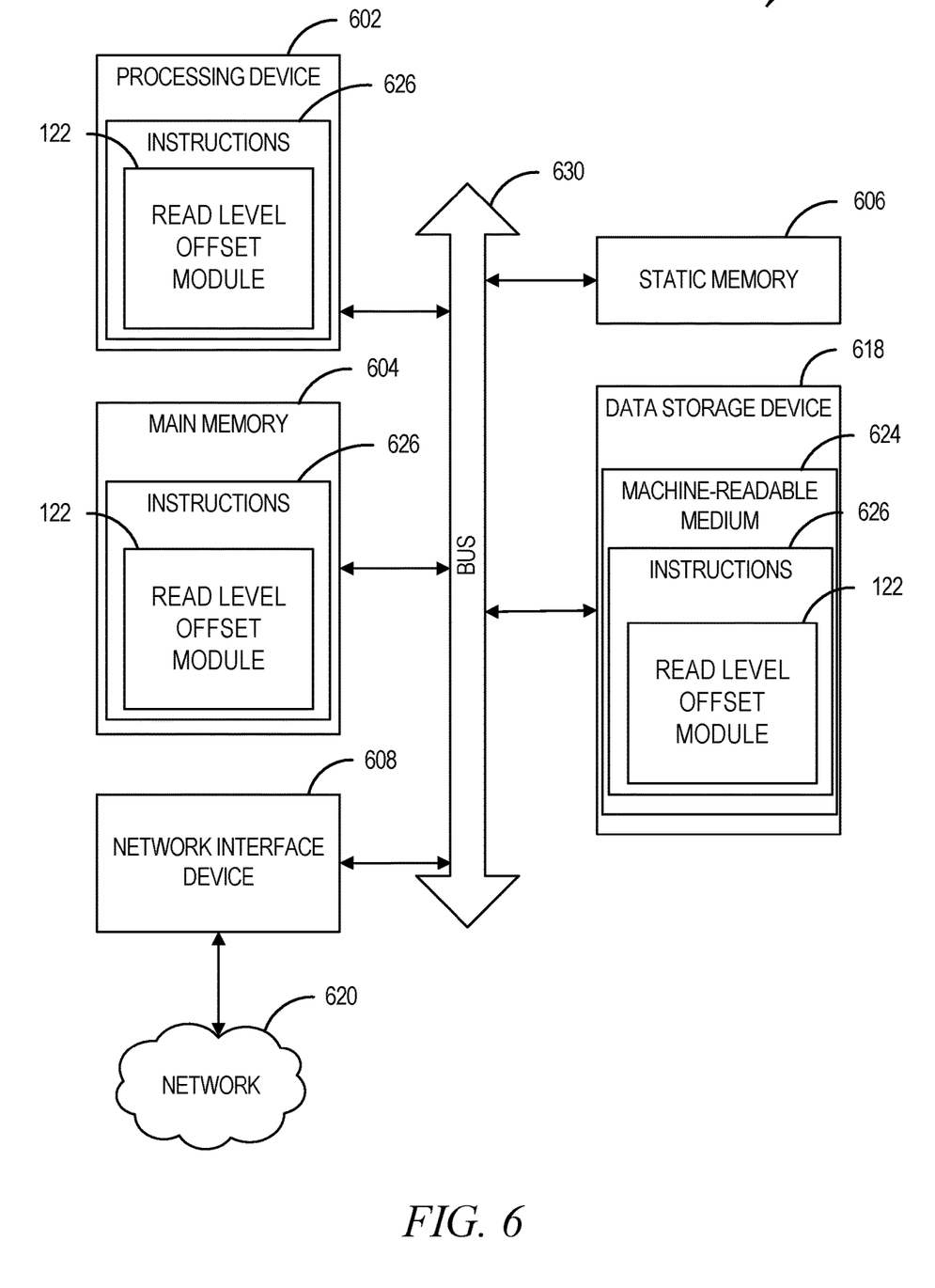
FIG. 6 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the read level offset module 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), a network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to the read level offset module 122 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the embodiments of the disclosure as set forth in the following claims. The specification and drawings are, accordingly, to be regarded in an illustrative sense rather than a restrictive sense.

What is claimed is:

1. A system comprising:
a memory sub-system comprising a set of memory components; and
a processing device, operatively coupled to the set of memory components and programmed to perform operations comprising:
maintaining a plurality of tables comprising different sets of read level offsets for a same set of read levels, each of the plurality of tables being associated with a different features of the set of memory components;
determining a first read level offset, associated with reading a first set of data from a first level of a plurality of read levels of an individual component of the set of memory components, using a first read level of a plurality of read levels stored in a first table of the plurality of tables;
determining an environmental factor associated with the individual component, the environmental factor comprising a temperature or program-erase count (PEC) of the individual component;
applying the first read level offset and the environmental factor to a machine learning model to estimate a second read level offset, associated with reading a second set of data from a second level of the plurality of read levels, using a second read level of the plurality of read levels;
updating, based on the first read level offset and the estimated second read level offset, the first table by replacing the set of read level offsets stored in the first table using the estimated second read level offset;

applying an individual read level offset of a second table of the plurality of tables to the machine learning model to estimate an additional read level offset; and updating, based on the individual read level offset and the estimated additional read level offset, the second table by replacing the set of read level offsets stored in the second table using the estimated additional read level offset.

2. The system of claim 1, the operations comprising:
identifying a bin of the first table corresponding to the first read level offset; and
replacing an individual read level offset value of the set of read level offsets associated with the identified bin and corresponding to the second read level with a value of the estimated second read level offset.

3. The system of claim 1, the operations comprising:
estimating, by the machine learning model, read level offsets for each of the plurality of read levels using the first read level offset.

4. The system of claim 3, the operations comprising:
identifying a bin of the first table corresponding to the first read level offset; and
replacing each read level offset value of the set of read level offsets associated with the identified bin and corresponding to a respective one of the plurality of read levels with a respective value of the estimated read level offsets.

5. The system of claim 1, wherein the first read level offset is determined by:
performing a scan operation on the individual component to determine the first read level offset.

6. The system of claim 5, the operations comprising:
gradually applying different read levels to read the first set of data; and
determining that the first read level offset has been reached in response to determining that an individual one of the different read levels reaches a center of valley (CoV).

7. The system of claim 1, the operations comprising:
determining a bin of the first table that is currently associated with the individual component;
accessing the set of read level offsets of the determined bin stored in the first table; and
reading one or more data sets from an individual level of the plurality of read levels of the individual component using a read level that is computed using an individual read level offset of the set of read level offsets corresponding to the individual level.

8. The system of claim 1, wherein the machine learning model is trained during manufacture of the memory subsystem.

9. The system of claim 1, wherein the machine learning model comprises at least one of an artificial neural network or a linear regression model.

10. The system of claim 1, wherein the machine learning model is trained based on training data to establish a relationship between a plurality of features comprising one or more first read level offsets and ground truth read level offsets of one or more other levels of the plurality of read levels.

11. The system of claim 10, wherein the plurality of features include at least one of: an operating temperature, a current bin of a plurality of bins, an elapsed programming time of data, or the PEC of the individual component.

12. The system of claim 1, wherein the first level corresponds to level 7 of the individual component, and wherein the second level corresponds to any one of levels 1-6.

13. The system of claim 1, wherein the machine learning model comprises a plurality of machine learning models, each of the plurality of machine learning models being trained to estimate a read level offset for a respective one of the plurality of read levels based on the first read level offset.

14. The system of claim 1, the operations comprising:
storing the first table of the plurality of tables, the first table associated with a first feature of the different features associated with the set of memory components, the first table comprising a first set of read level offsets of the plurality of read levels; and
storing the second table of the plurality of tables, the second table associated with a second feature of the different features associated with the set of memory components, the second table comprising a second set of read level offsets of the plurality of read levels.

15. The system of claim 14, the operations comprising:
identifying a current feature of the individual component;
selecting an individual table from the plurality of tables comprising the first table and the second table based on the identified current feature; and
accessing data from the individual component using the selected individual table.

16. The system of claim 14, wherein the plurality of features include at least one of: an operating temperature, a current bin of a plurality of bins, an elapsed programming time of data, the PEC of the individual component.

17. The system of claim 1, wherein the memory subsystem comprises a three-dimensional NAND storage device, and wherein the individual component includes a superblock comprising a plurality of memory blocks across a plurality of memory dies.

18. A method comprising:
maintaining a plurality of tables comprising different sets of read level offsets for a same set of read levels, each of the plurality of tables being associated with a different features of a set of memory components;
determining a first read level offset associated with reading a first set of data from a first level of a plurality of read levels of an individual component of the set of memory components using a first read level of the plurality of read levels, the individual component configured to store data in the plurality of read levels each associated with a read level of the plurality of read levels stored in a first table of the plurality of tables;
determining an environmental factor associated with the individual component, the environmental factor comprising a temperature or program-erase count (PEC) of the individual component;
applying the first read level offset and the environmental factor to a machine learning model to estimate a second read level offset, associated with reading a second set of data from a second level of the plurality of read levels, using a second read level of the plurality of read levels;
updating, based on the first read level offset and the estimated second read level offset, the first table by replacing the set of read level offsets stored in the first table using the estimated second read level offset;
applying an individual read level offset of a second table of the plurality of tables to the machine learning model to estimate an additional read level offset; and
updating, based on the individual read level offset and the estimated additional read level offset, the second table by replacing the set of read level offsets stored in the second table using the estimated additional read level offset.

19. The method of claim 18, comprising:
identifying a bin of a plurality of bins corresponding to the first read level offset; and
replacing an individual read level offset value of the set of read level offsets associated with the identified bin and corresponding to the second read level with a value of the estimated read level offset.

20. A non-transitory computer-readable storage medium comprising instructions that, when executed by a processing device, cause the processing device to perform operations comprising:
maintaining a plurality of tables comprising different sets of read level offsets for a same set of read levels, each of the plurality of tables being associated with a different features of a set of memory components;
determining a first read level offset associated with reading a first set of data from a first level of a plurality of read levels of an individual component of the set of memory components using a first read level of the plurality of read levels, the individual component configured to store data in the plurality of read levels each associated with a read level of the plurality of read levels stored in a first table of the plurality of tables;
determining an environmental factor associated with the individual component, the environmental factor comprising a temperature or program-erase count (PEC) of the individual component;
applying the first read level offset and the environmental factor to a machine learning model to estimate a second read level offset, associated with reading a second set of data from a second level of the plurality of read levels, using a second read level of the plurality of read levels;
updating, based on the first read level offset and the estimated second read level offset, the first table by replacing the set of read level offsets stored in the first table using the estimated second read level offset;
applying an individual read level offset of a second table of the plurality of tables to the machine learning model to estimate an additional read level offset; and
updating, based on the individual read level offset and the estimated additional read level offset, the second table by replacing the set of read level offsets stored in the second table using the estimated additional read level offset.

* * * * *